United States Patent
Rabbers et al.

(10) Patent No.: US 7,257,649 B2
(45) Date of Patent: Aug. 14, 2007

(54) METHOD AND SYSTEM FOR TRANSFERRING INFORMATION DURING SERVER SYNCHRONIZATION WITH A COMPUTING DEVICE

(75) Inventors: David L. Rabbers, Newcastle, WA (US); Brian Scott, Renton, WA (US); Martin Susser, University Place, WA (US); David J. George, Bellevue, WA (US)

(73) Assignee: Siebel Systems, Inc., San Mateo, CA (US)

( * ) Notice: Subject to any disclaimer, the term of this patent is extended or adjusted under 35 U.S.C. 154(b) by 838 days.

(21) Appl. No.: 09/976,400

(22) Filed: Oct. 11, 2001

(65) Prior Publication Data

US 2007/0083676 A1    Apr. 12, 2007

Related U.S. Application Data

(63) Continuation-in-part of application No. 09/967,439, filed on Sep. 28, 2001.

(51) Int. Cl.
*G06F 15/16* (2006.01)
*G06F 12/00* (2006.01)

(52) U.S. Cl. ............... 709/248; 707/203; 707/204

(58) Field of Classification Search ........... 709/246, 709/247, 248, 250; 707/10, 103 R, 201, 707/101, 203, 204
See application file for complete search history.

(56) References Cited

U.S. PATENT DOCUMENTS

| | | | |
|---|---|---|---|
| 5,640,566 A | 6/1997 | Victor et al. | |
| 5,684,990 A | 11/1997 | Boothby | |
| 5,812,819 A | 9/1998 | Rodwin et al. | |
| 5,831,664 A | 11/1998 | Wharton et al. | |
| 5,845,293 A | 12/1998 | Veghte et al. | |
| 5,857,201 A | 1/1999 | Wright, Jr. et al. | |
| 5,862,327 A | 1/1999 | Kwang et al. | |
| 5,867,688 A | 2/1999 | Simmon et al. | |
| 5,974,238 A | 10/1999 | Chase, Jr. | |
| 5,991,771 A * | 11/1999 | Falls et al. ............ | 707/202 |

(Continued)

FOREIGN PATENT DOCUMENTS

WO    WO 98/38583 A1    9/1998

(Continued)

OTHER PUBLICATIONS

N. Borenstein, RFC 1521, MIME (Multipurpose Internet Mail Extensions) Part One:, Sep. 1993, Chapter 5.*

(Continued)

*Primary Examiner*—Nathan J. Flynn
*Assistant Examiner*—Ashok Patel
(74) *Attorney, Agent, or Firm*—Campbell Stephenson LLP

(57) ABSTRACT

A method and apparatus for transferring information in synchronizing a server and a handheld device are disclosed. The information is binary information that is then compressed using a suitable compression algorithm. The compressed binary data is then text encoded using a suitable text encoding algorithm. The text encoded information is then encoded according to a protocol associated with the connection between the server and the handheld device. For example, the server can perform the compression and encoding operations on database data to be downloaded to the handheld device to reduce the time needed to transfer the information between the server and the handheld device.

23 Claims, 11 Drawing Sheets

U.S. PATENT DOCUMENTS

| | | |
|---|---|---|
| 6,000,000 A | 12/1999 | Hawkins et al. |
| 6,002,852 A | 12/1999 | Birdwell et al. |
| 6,006,274 A | 12/1999 | Hawkins et al. |
| 6,189,011 B1 | 2/2001 | Lim et al. |
| 6,205,448 B1 | 3/2001 | Kruglikov et al. |
| 6,212,529 B1 | 4/2001 | Boothby et al. |
| 6,216,135 B1 | 4/2001 | Brodersen et al. |
| 6,233,577 B1 | 5/2001 | Ramasubramani et al. |
| 6,233,600 B1 * | 5/2001 | Salas et al. ............... 709/248 |
| 6,233,617 B1 | 5/2001 | Rothwein et al. |
| 6,237,024 B1 | 5/2001 | Wollrath et al. |
| 6,269,369 B1 | 7/2001 | Robertson |
| 6,272,545 B1 | 8/2001 | Flanagin et al. |
| 6,295,541 B1 | 9/2001 | Bodnar et al. |
| 6,317,797 B2 | 11/2001 | Clark et al. |
| 6,330,715 B1 | 12/2001 | Razzaghe-Ashrafi |
| 6,374,245 B1 | 4/2002 | Park |
| 6,378,036 B2 | 4/2002 | Lerman et al. |
| 6,393,434 B1 | 5/2002 | Huang et al. |
| 6,477,543 B1 | 11/2002 | Huang et al. |
| 6,493,720 B1 | 12/2002 | Chu et al. |
| 6,502,191 B1 * | 12/2002 | Smith et al. ............... 726/12 |
| 6,564,263 B1 | 5/2003 | Bergman et al. |
| 6,606,649 B1 | 8/2003 | Schwitters et al. |
| 6,611,293 B2 | 8/2003 | Tarnoff et al. |
| 6,611,849 B1 | 8/2003 | Raff et al. |
| 6,636,873 B1 | 10/2003 | Carini et al. |
| 6,642,966 B1 | 11/2003 | Limaye |
| 6,643,284 B1 * | 11/2003 | Inoue et al. ............... 370/352 |
| 6,694,335 B1 * | 2/2004 | Hopmann et al. ............ 707/201 |
| 6,694,336 B1 * | 2/2004 | Multer et al. ............... 707/201 |
| 6,718,348 B1 | 4/2004 | Novak et al. |
| 6,721,787 B1 | 4/2004 | Hiscock |
| 6,732,124 B1 | 5/2004 | Koseki et al. |
| 6,829,655 B1 | 12/2004 | Huang et al. |
| 2001/0055017 A1 | 12/2001 | Ording |
| 2002/0010807 A1 | 1/2002 | Multer et al. |
| 2002/0029227 A1 | 3/2002 | Multer et al. |
| 2002/0052952 A1 | 5/2002 | Yoshida et al. |
| 2002/0056011 A1 * | 5/2002 | Nardone et al. ............ 709/248 |
| 2002/0069218 A1 | 6/2002 | Sull et al. |
| 2002/0194205 A1 | 12/2002 | Brown et al. |
| 2003/0131098 A1 | 7/2003 | Huntington et al. |

FOREIGN PATENT DOCUMENTS

| | | |
|---|---|---|
| WO | WO 98/40805 A1 | 9/1998 |
| WO | WO 02/080015 A1 | 10/2002 |
| WO | WO 04/084082 A1 | 9/2004 |

OTHER PUBLICATIONS

PCT Notification of Transmittal of International Search Report for PCT Counterpart Application No. PCT/US03/05753 Containing International Search Report, 3 pgs. (May 7, 2003).

Zhiming Ding, et al., "A Novel Conflict Detection and Resolution Strategy Based on TLRSP in Replicated Mobile Database Systems," 7 pgs. (2001).

Wai Gen Yee, et al., "Scaling Replica Maintenance in Intermittently Synchronized Mobile Databases," CIKM '01, pp. 450-457 (Nov. 5-10, 2001).

* cited by examiner

METHOD AND SYSTEM FOR TRANSFERRING INFORMATION DURING SERVER SYNCHRONIZATION WITH A COMPUTING DEVICE

CROSS REFERENCE TO RELATED APPLICATIONS

This disclosure is a continuation-in-part of U.S. patent application Ser. No. 09/967,439, entitled "Method and Apparatus For Detecting Insufficient Memory For Data Extraction Processes" filed on Sep. 28, 2001.

TECHNICAL FIELD

This disclosure relates generally to computer systems, and in particular but not exclusively, relates to transferring data from one computer system into another.

BACKGROUND

Portable computing devices (also referred to herein as handheld devices) such as personal digital assistants (PDAs) available from vendors such as Palm, Handspring, Hewlett Packard, Sony, Casio, Psion, have found increasing acceptance in the business world. Some users have a need to use their handheld devices to interact with enterprise business applications such as those offered by Siebel Systems, Inc., Oracle Corporation and others. These enterprise business applications can include large databases that a number of users may access and/or update at any time.

Providing access to enterprise business applications through a handheld device can encounter significant problems due to the relatively limited amount of computing power, energy storage and memory available on typical handheld devices. For example, a user may wish to extract data that resides in a server used in supporting an enterprise business application. In view of the limited resources of the handheld device, it is generally desirable that the handheld device be designed and configured to efficiently receive the extracted data.

SUMMARY

In accordance with aspects of the present invention, a method and apparatus is provided for transferring information between a server and a handheld device. In one aspect, the information is binary information that is then compressed using a suitable compression algorithm. The compressed binary data is then text encoded using a suitable text encoding algorithm. The text encoded information is then encoded according to a protocol associated with the connection between the server and the handheld device. For example, the server can perform the compression and encoding operations on database data to be downloaded to the handheld device. This aspect advantageously reduces the time needed to transfer the information between the server and the handheld device.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Figure 1:
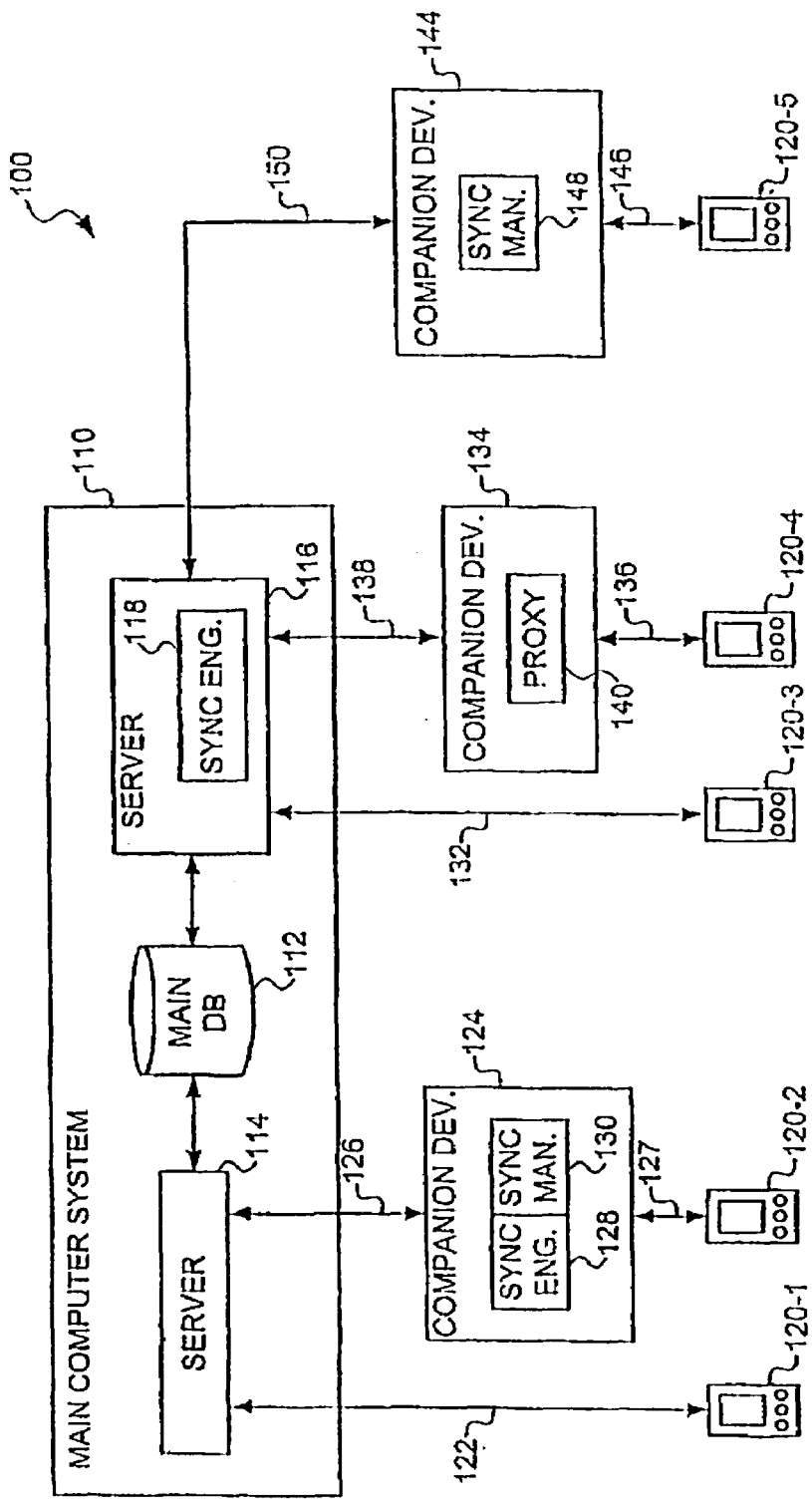
FIG. 1 is a block diagram illustrating a system having a main database that is accessible to users through handheld devices, in accordance with one embodiment of the present invention.

Embodiments of an apparatus and method for transferring information during server synchronization with a computing device are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following description, for purposes of explanation, specific nomenclature may be set forth to provide a thorough understanding of the present invention. However, it will be apparent to one skilled in the art after reading the description that these specific details are not required in order to practice the present invention.

Some portions of the detailed descriptions that follow may be presented in terms of algorithms and symbolic representations of operations on information stored in a computer memory. These algorithmic descriptions and representations can be used by those skilled in the art to convey the substance of their work to others skilled in the art. An algorithm is here, and generally, conceived to be a self-consistent sequence of steps or operations leading to a desired result. These steps or operations may require physical manipulations of physical quantities. Usually, thought not necessarily, these quantities take the form of electrical, magnetic or electromagnetic signals capable of being stored, transferred, combined, compared or otherwise manipulated. These signals are commonly referred to here, and generally, as bits, bytes, words, values, elements, symbols, characters, terms, numbers or the like.

Unless specifically stated otherwise, terms such as "processing", "computing", "calculating", "determining", "displaying" or the like refer to actions and processes of a computer system, or other similar electronic computing device. In particular, these actions and processes manipulate and transform data represented as physical quantities (as described above) within the computer system's registers and memories into other data similarly represented as physical quantities with within the computer system's memories or registers or other information storage, transmission or display devices.

The present invention also relates to one or more apparatus for performing the operations described herein. An apparatus may be specially constructed for the required purposes, or include a general-purpose computer selectively activated or configured by a computer program stored in the computer. Such a computer program may be stored in a computer readable storage medium such as, but not limited to, any type of disk including floppy disks, optical disks, compact disks (CDs) and magnetic-optical disks. Other storage mediums include: read only memories (ROMs) including erasable and electrically erasable programmable ROMs (EPROMs and EEPROMs); random access memories (RAMs) including static and dynamic RAMs; and magnetic or optical cards.

Algorithms and displays presented herein are not inherently related to any particular computer or other apparatus unless specifically stated otherwise. Various general-purpose systems, as well as specialized apparatus, may be used with programs in accordance with the teachings herein. In addition, the present invention is not described with reference to a particular programming language. In light of the present disclosure, those skilled in the art can use a variety of programming languages to implement the teachings of the present disclosure without undue experimentation.

System Overview

FIG. 1 illustrates a system 100 having a database that is accessible to users through handheld devices, in accordance with one embodiment of the present invention. System 100 includes a main computer system 110 having a main database 112 and a server connected to database 112. In a first possible embodiment, the server is implemented with a server 114. In a second possible embodiment, the server is implemented with a server 116 that includes a synchronization engine (sync engine) 118. In a third possible embodiment, main computer system 110 may include both server 114 and server 116. Servers 114 and 116 are both shown in FIG. 1 for convenience; however, one of the servers may be omitted in the aforementioned first and second embodiments.

System 100 also includes handheld devices that users may use to remotely access main database 112. Handheld devices 120-1, 120-2, 120-3, 120-4 and 120-5 are shown in FIG. 1. When server 114 is present in system 100, a user may remotely access main database 112 using handheld device 120-1 via a connection 122 to server 114. In one embodiment, connection 122 is implemented using a standard telephone modem and the serial interface defined by the handheld device manufacturer.

Alternatively, a user may remotely access main database 112 via an intermediary computing device (also referred to herein as a companion device) 124, which is connected to server 114 via a connection 126. Typically, companion device 124 is a more powerful computing device (i.e., having more memory, a processor with better performance, a larger power supply, etc.) than typical handheld devices. For example, a companion device may be a desktop or notebook computer. Handheld device 120-2 and companion device 124 transfer information over a connection 127. In one embodiment, connection 127 is implemented using a serial interface typically provided with the handheld device. For example, connection 127 may be implemented using a serial port, parallel port, or other bus protocol. Some handheld devices include a cradle assembly that provides the physical interconnection between the handheld device and a companion device.

In this embodiment, companion device 124 includes synchronization engine (sync engine) 128 and a synchronization manager (sync manager) 130. Sync engine 128 performs a similar function as sync engine 118 of server 116. In some embodiments, sync manager 130 and sync engines 118 and 128 are implemented in software that is executed by one or more processors of companion device 124 or server 116. Further, although not shown in FIG. 1, this embodiment of handheld device 120-1 includes a sync engine and sync manager serving essentially the same functions as sync engine 128 and sync manager 130.

When server 116 is present in main computer system 110, a user may access main database 112 using handheld device 120-3 via a connection 132 to server 116. Connection 132 can be a telephone modem connection as previously described for connection 122, or any other type of connection supported by both server 116 and handheld device 120-3. Although not shown, this embodiment of handheld device 120-3 includes a sync manager that provides essentially the same functions as sync manager 130. As previously described, server 116 includes sync engine 118, allowing devices that access main database 112 via server 116 to dispense with having their own sync engines.

Alternatively, a user may access main database 112 using handheld device 120-4 through a companion device 134, which is connected to handheld device via a connection 136. Connection 136 is typically the serial interface that is provided by the handheld device vendor. Companion device 134 is connected to server 116 via a connection 138. In this embodiment, handheld device 120-4 includes a sync manager component (not shown) similar to that of handheld device 120-3. Companion device 134 includes an interface component (also referred to herein as a proxy) 140 that allows data transfers between server 116 and handheld device 120-4, which may be different. For example, in one embodiment connection 138 (i.e., the server-companion device connection) may be a HTTP (hyper text transport protocol) connection (e.g., an Internet connection) while connection 136 (i.e., the companion device-handheld device connection) may be a proprietary handheld device synchronization connection. Thus, interface component 140 serves, in effect, as a proxy between server 116 and handheld device 120-4.

Still further, a user may access main database 112 using handheld device 120-5 through a companion device 144, which is connected to handheld device 120-5 via a connection 146. In this embodiment, companion device 144 includes a sync manager 148, which communicates with server 116 via a connection 150. Sync manager 148 of companion device 144 allows handheld device 120-5 to dispense with having a sync manager component.

In practice, several users may access main database 112 using a handheld device via each of the five above paths (i.e., communication paths between main database 112 and handheld devices 120-1 through 120-5). Thus, for example, although only one handheld device 120-3 is shown in FIG. 1 as directly coupled to server 116, several users can access main database 112 in the essentially the same way using handheld devices that are configured in the substantially the same way as handheld device 120-3.

Further, other embodiments of system 100 may be implemented with various combinations or permutations of the five paths described above. For example, system 100 may be implemented to support only the paths between main database 112 and handheld devices 120-3 (via server 116 and direct connection 132) and 120-4 (via server 116 and companion device 134). This exemplary embodiment allows a handheld device that is configured with a sync manager to perform either a direct synchronization or a companion synchronization (via proxy 140).

In addition, although telephone modem, HTTP, and standard handheld synchronization connections are described above, any suitable connection can be used in other embodiments. For example, other embodiments may use protocols other than HTTP. In addition the signal propagation mediums used by the connections may be wired (e.g., using mediums such as twisted pair, cable, and optical fiber) or wireless (e.g., using technologies such as infrared, radio-frequency and optical technologies).

One of the functions of system 100 is to synchronize selected information between main computer system 110 and a handheld device. For example, the information may be database data stored in main database 112 and a local database (not shown) in a handheld device. During operation of system 100, the database data is updated frequently by users. The updated database data is distributed to users via synchronization processes. In addition, the information to be synchronized may include definitions (also referred to herein as metadata) used by an application executed in the handheld device. Some of the operations performed during a synchronization process are described below in conjunction with FIG. 2.

Figure 2:
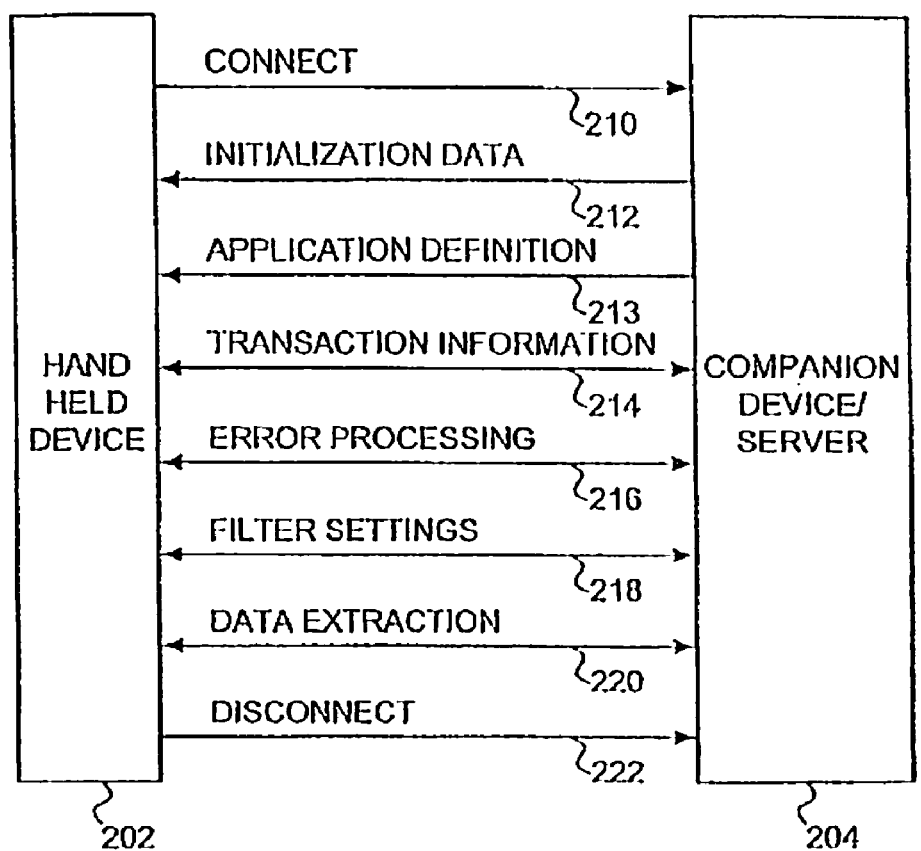
FIG. 2 is a diagram illustrating dataflow between a handheld device and another computer system, according to one embodiment of the present invention.

FIG. 2 illustrates dataflow between a handheld device 202 and another computer system 204 in synchronizing data, according to one embodiment of the present invention. For example, computer system 204 may be implemented by: (a) one of servers 114 or 116; or (b) companion device 124; or (c) companion device 134 combined with one of servers 114 or 116; or (d) companion device 144 combined with one of servers 114 or 116. Some specific implementations of the dataflow operations in FIG. 2 are described in conjunction with FIGS. 3-11 below.

Referring back to FIG. 2, handheld device 202 can initiate a connection with computer system 204 as indicated by arrow 210 in FIG. 2. In one embodiment, handheld device 202 initiates this connection with computer system 204 by logging in using a modem (e.g., via an Internet connection). For example, this connection may be a standard HTTP connection. In another embodiment, handheld device 202 may initiate this connection with a companion device using the synchronization interface application and hardware provided by the handheld device vendor. For example, this connection may be initiated when the user places handheld device 202 into a supplied cradle accessory and activates a synchronization button on the cradle.

In this embodiment, computer system 204 then provides initialization data to handheld device 202, and indicated by arrow 212 in FIG. 2. In one embodiment, the initialization information can include information related to the latest version of main database 112. For example, a new table may have added to main database 112. In addition, the initialization information may include information related to the most recent transaction (see description below) uploaded to computer system 204. In one embodiment, handheld device 202 pulls this initialization information after the connection is established. Alternatively, computer system 204 may push the initialization information to handheld device 202 in response to the connection being established.

As shown by an arrow 213 in FIG. 2, computer system 204 can then transfer application definition information to handheld device 202. In one embodiment, this application definition information can include information related to definitions used in the application that the user uses to access the local database of handheld device 202 (also referred to herein as the handheld application). For example, this application definition information can include the views and screens displayed by the handheld application in providing a user interface. In one embodiment, handheld device 202 determines if its local application definition needs to be updated (using the initialization information) and if so, pulls this information from computer system 204. In other embodiments, computer system 204 may receive information from handheld device 204 that indicates the version of its application definition. Computer system 204 can then determine whether handheld device 202 needs updated application definition information, and if so, push the updated application definition to handheld device 202.

Handheld device 202 can transfer transaction information to computer system 204, as indicated by an arrow 214 in FIG. 2. In one embodiment, all of the local database transactions entered into handheld device 202 by the user are recorded. This recorded transaction information is transferred to computer system 204, which then performs the transactions in main database 112 (FIG. 1). In some embodiments, handheld device 202 transfers the transaction information in one block to computer system 204. After the entire block has been received, computer system 204 would determine whether the block was properly received. In other embodiments, handheld device 202 transfers the transaction information in a number of relatively small blocks. After each small block is received, computer system 204 can determine whether that block was properly received and send a message or signal to handheld device 202 to either retransmit that block or send the next block. Thus, if there is a problem or interruption during the transfer, handheld device 202 need only transfer the blocks that have not been properly received, rather than retransmitting all of the transaction information.

Computer system 204 can then transfer error information to handheld device 202, as indicated by an arrow 216 in FIG. 2. In one embodiment, this error information includes: (a)

information on transactions that system 100 (FIG. 1) does not permit the user to make transactions on data that was also changed by one or more other users; and (b) information on changes made to the transactions by the server. The user can then manually correct or dispose of these errors on handheld device 202.

In addition, handheld device 202 and computer system 204 can update filter settings, as shown by arrow 218 in FIG. 2. The filter settings are set so that unwanted or unneeded information is not transferred between handheld device 202 and computer system 204, thereby conserving limited resources on handheld device 202. In this embodiment, a user can update filter settings for handheld device 202 and then upload them to computer system 204. Thus, computer system 204 can then avoid downloading information that the user does not want. Further, in this embodiment, computer system 204 processes the filter settings received from handheld device 202 to ensure that the filter settings are proper. For example, the user may have attempted to filter out information that is required by an application running on handheld device 202 to properly execute.

Computer system 204 can then transfer database data to handheld device 202, as indicated by an arrow 220 in FIG. 2. This operation is also referred to herein as "data extraction." In one embodiment, computer system 204 forms an image of all of the database data that is visible to handheld device 202 and after being filtered. This image is also referred to herein as an extract. Computer system 204 then downloads this extract to handheld device 202. In one embodiment, computer system 204 downloads the extract in a series of relatively small blocks, with handheld device 202 acknowledging the reception of each small block.

In another embodiment, computer system 204 stores the extract after each download. On the next data extraction operation, computer system 204 can compare the current extract with the previous extract and download only the database data that has changed (also referred to herein as a delta extract). The previous extract can then be deleted. In a further refinement, in certain circumstances, computer system 204 may ignore the previous extract and, instead, download the entire current extract. For example, if the structure of main database 112 (FIG. 1) changed since the previous extract, then computer system 204 would then perform a full extract rather than attempt to perform a delta extract. Handheld device 202 can then disconnect from computer system 204, as indicated by an arrow 222 in FIG. 2.

Figure 3:
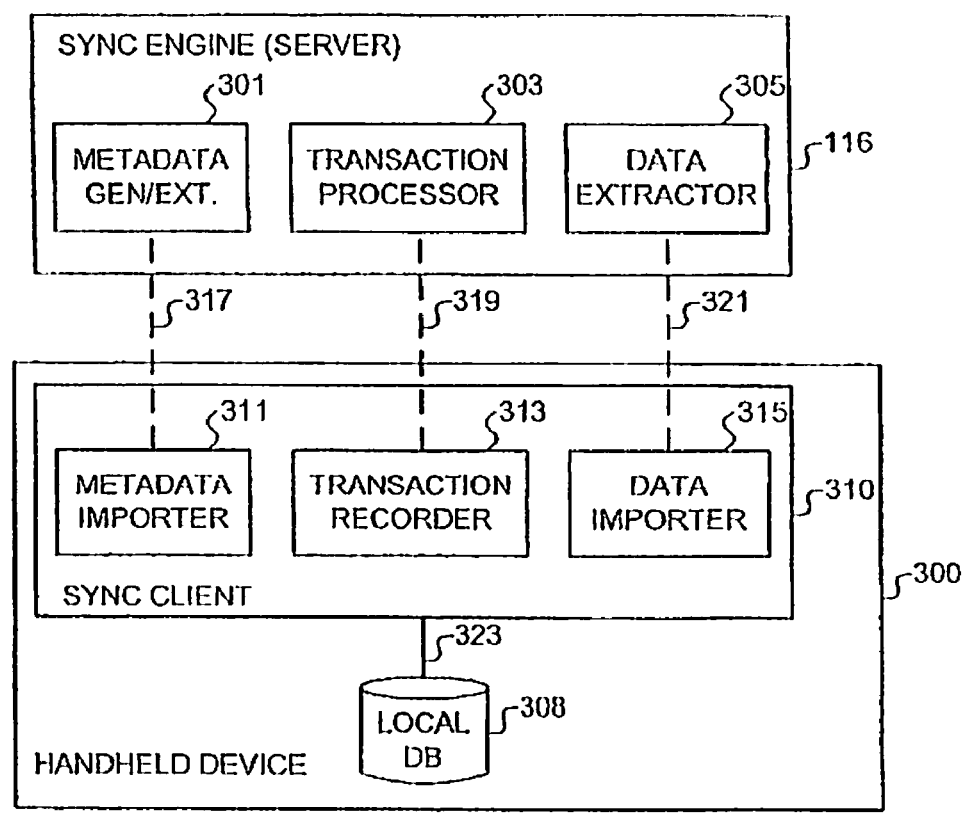
FIG. 3 is a top-level block diagram illustrating components of a server and a client used in synchronizing a handheld device, according to one embodiment of the present invention.

FIG. 3 illustrates components of sync engine 116 (FIG. 1) and a handheld device 300 used in a synchronizing operation, according to one embodiment of the present invention. Handheld device 300 can be used to implement any of handheld devices 120-3 through 120-5 (FIG. 1).

In this embodiment, sync engine 116 includes a metadata extractor 301, a transaction processor 303 and a data extractor 305. Handheld device 300 includes a local database 308 and a synchronization client (sync client) 310 having a metadata importer 311, a transaction recorder 313 and a data importer 315. In this embodiment, sync client 310 and its components are implemented in software.

The above-mentioned elements of sync engine 116 and sync client 300 are interconnected as follows. Metadata generator/extractor 301 of sync engine 116 is operatively coupled to metadata importer 311 of sync client 310, as indicated by a dashed line 317. Transaction processor 303 of sync engine 116 is operatively coupled to transaction recorder 313 of sync client 310, as indicated by a dashed line 319. Data extractor 305 of sync engine 116 is operatively coupled to data importer 315 of sync client 310 as indicated by a dashed line 321. Sync client 310 can access local database 308 as indicated by a line 323. These components operate as follows.

In this embodiment, some of the main functions of metadata generator/extractor 301 are to determine whether sync client 310 needs updated metadata, to extract metadata that is stored on server 116, and to transfer the extracted metadata to handheld device 300. The metadata includes definitions for screens, views, fields, etc., for the handheld application (not shown) used to access local database 308. Metadata generator/extractor 301 extracts the metadata (stored in a particular format in server 116) and forms messages or datagrams containing the metadata for transmission to sync client 310.

Metadata importer 311 of sync client 310 processes the metadata sent by metadata generator/extractor 301 to update the handheld application in handheld device 300. For example, in one embodiment, metadata importer 311 can determine whether handheld device has enough memory to store the metadata before requesting sync engine 116 to download the metadata. After handheld device 300 stores the metadata, metadata importer 311 can then update the handheld application (not shown) with the new application definitions included in the metadata. One embodiment of the operation is described in more detail below in conjunction with FIG. 9.

In this embodiment, transaction recorder 313 in handheld device 300 records information related to transactions to local database 308 made by the user. For example, each time the user changes data in local database 308, transaction recorder 313 assigns a transaction identifier (transaction ID) and records the transaction ID and other pertinent information about the transaction. In another embodiment, the transaction ID can be assigned when a synchronization process is performed. The above-mentioned other pertinent information can include, for example, the field being changed, the previous and new data, record identifiers and names, and specifications of record relationships that can be used by server 116 to find the changed record or create the new record on main database 112 (FIG. 1). Transaction recorder 313 can then upload the transactions to transaction processor 303 of sync engine 116.

Transaction processor 303 receives the transactions from handheld device 300 and performs each transaction to update main database 112 (FIG. 1). A transaction may conflict with another transaction from another user, in which case transaction processor 303 reports an error without performing the transaction. One embodiment of this operation is described in more detail below in conjunction with FIG. 7. In another embodiment, transaction processor 303 modifies one or more portions of the transaction so that the transaction will succeed. Transaction processor 303 can then send a message to handheld device 300 informing the user of the modification that was performed.

In this embodiment, data extractor 305 of sync engine 116 extracts database data that is visible to handheld device 300 from main database 112 (FIG. 1). The term visibility has a well-known meaning in relation to remote access of databases (see for example, U.S. Pat. Nos. 6,216,135 and 6,233, 617). In addition, in this embodiment, data extractor 305 can avoid extracting data according to the filter settings (described previously in conjunction with arrow 218 of FIG. 2). Data extractor 305 also forms the extracted database data into a file to be downloaded to handheld device 300. In one embodiment, sync engine 116 may send the file to handheld device 300 in a series of small messages or datagrams.

Data importer 315 of handheld device 300 receives the file and temporarily stores the file for updating local database 308. As described below, the file may contain the updated database data in a format that is different from that of local database 308. In such a case, a separate component may be used to process the data into the format of local database 308.

Handheld Devices

Figure 4:
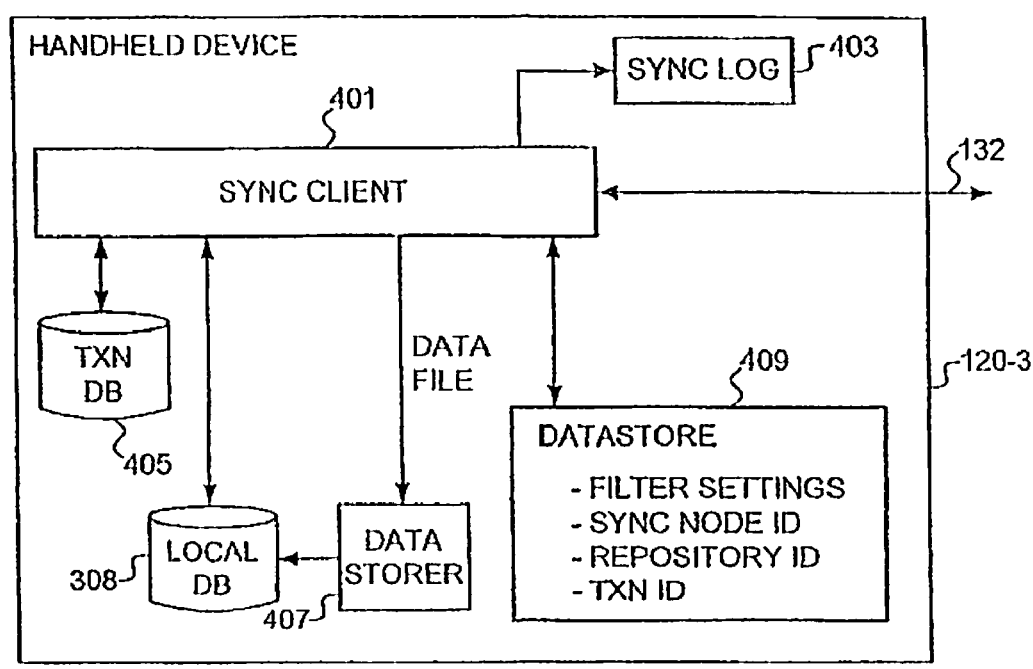
FIG. 4 is a more detailed block diagram illustrating components of a handheld device used in synchronizing the handheld device directly with the server, according to one embodiment of the present invention.

FIG. 4 illustrates handheld device 120-3 (FIG. 1), according to one embodiment of the present invention. In this embodiment, handheld device 120-3 is configured to synchronize directly with server 116. In addition to local database 308, handheld device 120-3 is configured with a sync client 401, a synchronization log (sync log) 403, a transaction database 405, a data storing application (also referred to herein as a data storer) 407 and a datastore 409. In this embodiment, sync client 401 performs the substantially similar functions as described for sync managers 130 and 148 (FIG. 1) that reside in companion devices. In particular, sync client 401 performs the functions of metadata importer 311, transaction recorder 313 and data importer 315 of sync client 310 (FIG. 3).

Sync log 403 is used to hold a list of all messages sent during synchronization operations (e.g., see the operations of FIG. 2), which can then be used to restore information if a problem occurs during synchronization. Transaction database 405 is used to store information related to each transaction (e.g., the information generated by transaction recorder 313 of FIG. 3). In one embodiment, sync manager stores the transaction information in transaction database 405. Alternatively, the handheld application (not shown) stores the transaction information in transaction database 405. Data storer 407 is used in this embodiment to process the downloaded database data to be in the format of local database 308. Datastore 409 is used to store filter settings, the version of local database 308, the version of the handheld application (not shown), a file defining the schema of the local database, and the aforementioned application definitions from the metadata. Datastore 409 is also used to store transaction error messages. In this embodiment, the versions of the local database and the handheld application are referred to herein as the extraction ID and the repository ID, respectively. In some embodiments, datastore 409 can include the operating system's registry (e.g., as in a Windows or Linux operating system).

Sync client 401 is operatively coupled to local database 308, sync log 403, transaction database 405, data storer 407 and datastore 409. Sync client 401 is also operatively coupled to server 116 (FIG. 1) via connection 132. In addition, data storer 407 is operatively coupled to local database 308. The operation of this embodiment of handheld device 120-3 is described below in conjunction with FIG. 6.

Figure 5:
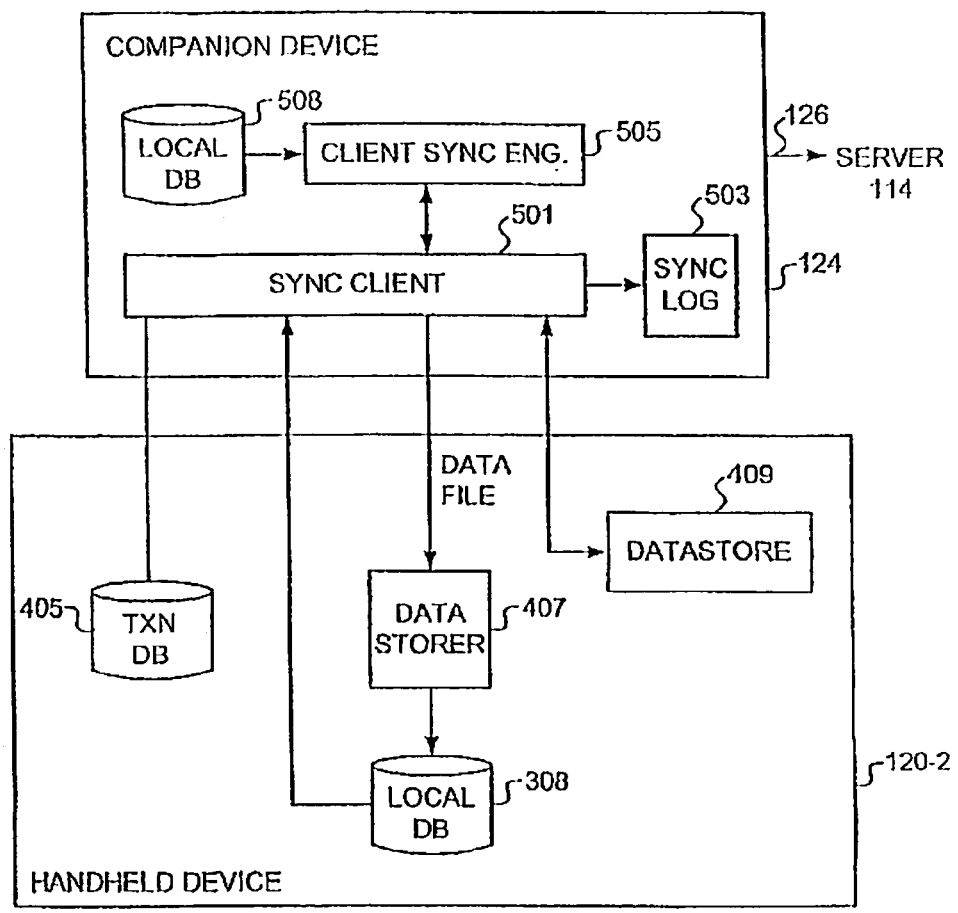
FIG. 5 is a diagram illustrating components of a companion device and a handheld device used in synchronizing the handheld device with the server through the companion device, according to one embodiment of the present invention.

FIG. 5 illustrates components of handheld device 120-2 (FIG. 1) and companion device 124 (FIG. 1), according to one embodiment of the present invention. This embodiment of handheld device 120-2 and companion device 124 together contain components similar to the those described above in handheld device 120-3 (FIG. 4). In particular, handheld device 120-2 is configured with local database 308, transaction database 405, data storer 407 and datastore 409. Companion device 124 is configured with a sync client 501 and a sync log 503, both of which perform functions similar to that of sync client 401 (FIG. 3) and sync log 403 (FIG. 3) of handheld device 120-3. In addition, companion device 124 is configured with a client sync engine 505 and a companion local database 508. Client sync engine 505 provides functions similar to that of sync engine 118 (FIG. 1) in accessing main database 112 (FIG. 1).

In this embodiment, sync client 501 is operatively coupled to local database 308, transaction database 405, data storer 407, and datastore 409 of handheld device 120-2. The interconnection can be implemented through connection 127 (FIG. 1). In addition, sync client 501 is operatively coupled to sync log 503, client sync manager 505 and companion local database 508. In one embodiment, companion local database 508 can store an image of local database 308 of handheld device 120-2. In such an embodiment, companion device 124 can be configured to synchronize companion local database 508 with main database 112 (FIG. 1). A subsequent synchronization of handheld device 120-2 will synchronize its local database 308 with the now synchronized companion local database 508.

Sync Client Processes

Figure 6:
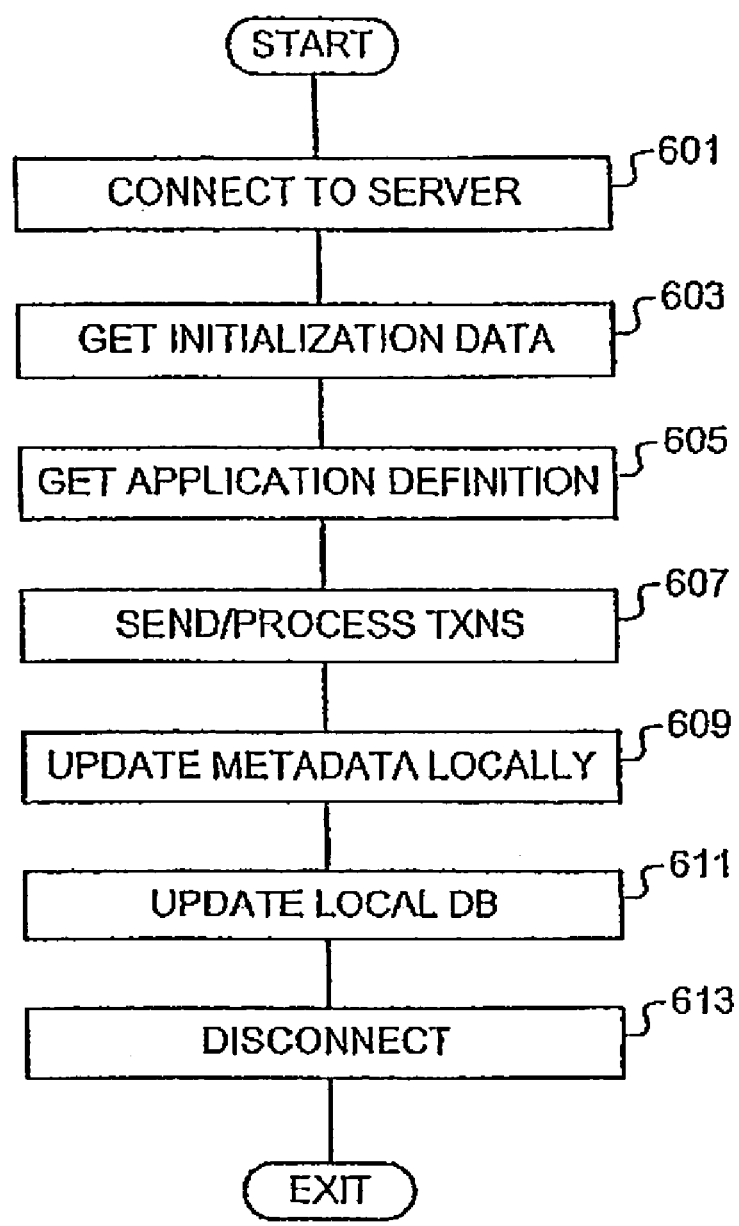
FIG. 6 is a flow diagram illustrating a synchronization process of a client, according to one embodiment of the present invention.

FIG. 6 illustrates the operation of a sync client during a synchronization process, according to one embodiment of the present invention. In this embodiment, the sync client is a handheld device with a direct connection to a server. For example, the handheld device and server can be handheld device 120-3 (FIG. 4) and server 116 (FIG. 1). Alternatively, the sync client can be implemented by the combination of a companion device and handheld device (e.g., companion device 124 and handheld device 120-2 as in FIG. 5). For convenience, the operation of the sync client is described in conjunction with handheld device 120-3 (FIG. 4) and server 116 (FIG. 1). In light of the present disclosure, those skilled in the art will appreciate that the following description can apply to other types of sync clients without undue experimentation.

Referring to FIGS. 4 and 6, one embodiment of a sync client operates as follows. In a block 601, the sync client connects with the server (or companion device in other embodiments). In one embodiment, sync client 401 connects to server 116 when the user performs a login process. In one embodiment, sync client 401 executes an interface or driver that operates a modem to directly access server 116. In other embodiments, this connection may be an Internet connection. In still other embodiments, the connection can be a wireless connection using RF or optical technology to implement a direct, web-based or other type of communication link.

In a block 603, the sync client receives initialization data. In one embodiment, sync client 401 receives initialization data from server 116 via connection 132. As previously described in conjunction with FIG. 2, this initialization data can include information related to the latest version of the main database 112 (e.g., the extraction ID), the latest transaction uploaded to server 116 and the latest version of the handheld application (e.g., the repository ID). In this embodiment, sync client 401 stores the initialization information in datastore 409.

In a block 605, the sync client can receive the application definition version. Block 605 may be omitted if the handheld application definition is included as part of the initialization data received in block 603. In one embodiment, server 116 sends the application definition version (which may have been updated) to sync client 401. Sync client 401 may compare the newly received application definition version with the application version already stored in datastore 409

(i.e., the current version of the handheld application). Sync client 401 then stores the new application definition version in datastore 409.

In a block 607, the sync client can provide transaction information to the server or companion device. In one embodiment, sync client 401 sends the transaction information stored in transaction database 405 to server 116. For example, sync client 401 may send the transaction information for all of the recorded transactions in one block of data. Alternatively, sync client 401 may send the transaction information in several smaller blocks, waiting for an acknowledgement from server 116 before sending the next smaller block. Embodiments of this operation are described in more detail below in conjunction with FIGS. 7 and 8.

In a block 609, the sync client can get metadata from the server. In one embodiment, sync client 401 receives the metadata from server 116. As previously described, this metadata includes application definitions for the handheld application. In this embodiment, sync client 401 performs block 609 if the application definition version received in block 605 does not match the locally stored application definition version (e.g., this situation may occur when the application definitions have been updated). One embodiment of this operation is described in more detail below in conjunction with FIG. 9. In another embodiment, sync client 401 does not compare the application definition versions but rather always requests the metadata from server 116. Server 116 would then determine whether the application definitions need to be updated.

In a block 611, the sync client updates its local database. In one embodiment, sync client 401 requests that server 116 initiates a data extraction operation to provide updated database data to handheld device 120-3. In this embodiment, the user may cause sync client 401 to update filters before getting the database data from server 116. Thus, server 116 will avoid downloading undesired database data, which helps conserve battery power and reduce the time needed to complete the synchronization process. In one embodiment, server 116 downloads the entire data extract (i.e., the data visible to the sync client and after filtering) in a single large block. In an alternative embodiment, server 116 may download a relatively small block of the data extract in response to a request by sync client 401. If handheld device 120-3 properly receives this block, sync client 401 can send a request for the next block, and so on until handheld device 120-3 receives the entire extract from server 116.

In a further refinement, sync client 401 can first determine whether to receive a full extract or a delta extract. For example, if the version of the database has changed (see block 603), sync client 401 can then request a full extract from server 116. However, if the version of the database has not changed, then sync client 401 can request a delta extract from server 116. For example, in a delta extract, server 116 would compare the full extract of the previous download to handheld device 120-3 to the current full extract. Server 116 would then only download records from the current full extract that are different from the corresponding records in the previous extract.

In a block 613, the sync client disconnects from the server (or companion device). In this embodiment, in response to input from the user, sync client 401 performs a log out process to disconnect from server 116.

Figure 7:
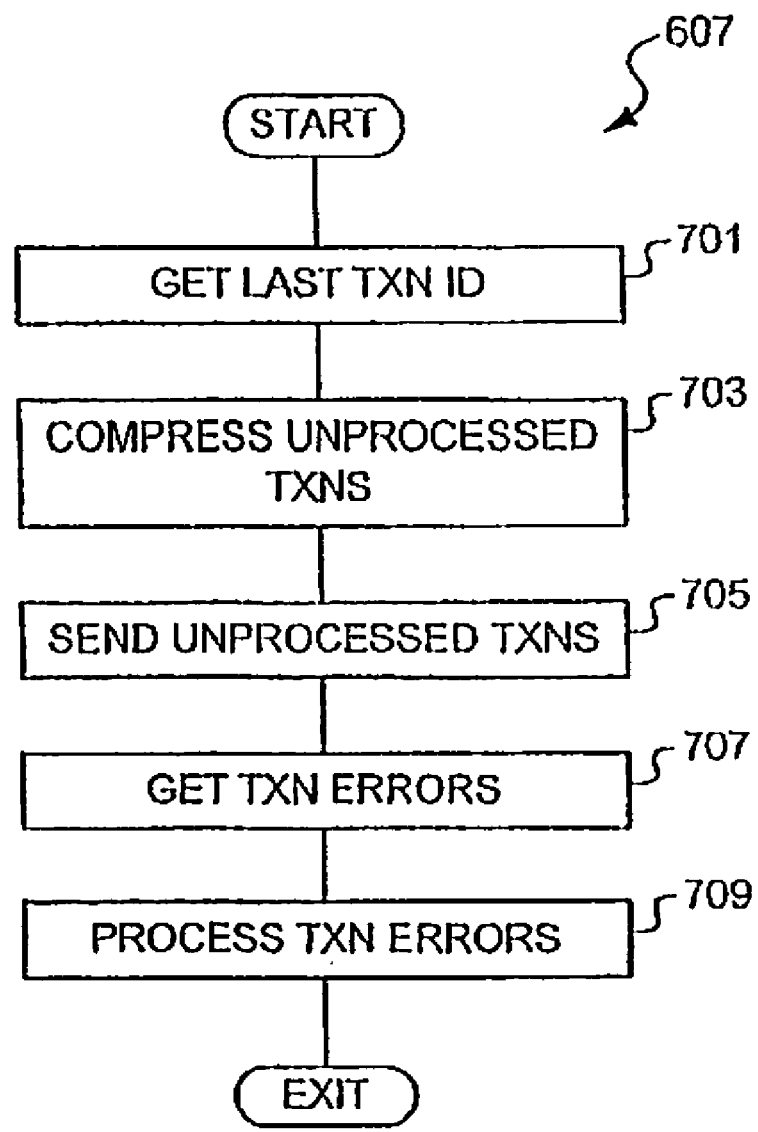
FIG. 7 is a flow diagram illustrating a transaction processing operation, according to one embodiment of the present invention.

FIG. 7 illustrates one embodiment of block 607 (FIG. 6) in more detail, in accordance with the present invention. A sync client performs the operations of FIG. 7. In this embodiment, the sync client resides in handheld device 120-3 that has a direct connection with server 116. As in the description of FIG. 6, the transaction processing operation of block 607 is described in conjunction with handheld device 120-3 (FIG. 4) and server 116 (FIG. 1). However, in light of the present disclosure, those skilled in the art will appreciate that the following description can apply to other types of sync clients without undue experimentation. Referring to FIGS. 4 and 7, block 607 is performed as follows in this exemplary embodiment.

In a block 701, the sync client receives information related to the last transaction uploaded to the server or (companion device). In one embodiment, sync client 401 gets a transaction identifier (transaction ID) from server 116. This transaction ID is the identifier of the last transaction received by server 116. In one embodiment, handheld device 120-3 generates a transaction ID using a pseudo-unique ID generator when initialized. In another embodiment, ID generation is guaranteed to be unique. Sync client 401 then increments this pseudo-unique ID each time handheld device 120-3 uploads information recorded for a transaction (also referred to herein as "uploading a transaction") to server 116. In this embodiment, sync client 401 can then compare the received transaction ID with the transaction information in transaction database 405 to send the unprocessed transaction information (i.e., transactions having a transaction ID greater than the transaction ID received from server 116).

In a block 703, the sync client may compress the unprocessed transactions to be uploaded. In one embodiment, sync client 401 compresses the transaction information using any suitable compression algorithm. Sync client 401 may then also convert the compressed information into the format supported by the connection between handheld device 120-3 and server 116 (e.g., text for use in a HTTP connection). In alternative embodiments, block 703 may be omitted (i.e., the information need not be compressed).

In a block 705, the sync client then uploads the information of unprocessed transactions. In one embodiment, sync client 401 sends the transaction information to server 116 in a single large block. Alternatively, sync client 401 can send the transaction information in a series of smaller blocks. In one such embodiment, server 116 provides an acknowledgement after properly receiving each smaller block from handheld device 120-3. One embodiment of this operation is described in more detail below in conjunction with FIG. 8.

In a block 707, the sync client gets information regarding errors (if any) that occurred during block 705. In one embodiment, server 116 keeps a record of all of the errors that occurred in processing the transactions. For example, an error may be that a transaction has attempted to update a field that was more recently updated by another user who synchronized before the user of handheld device 120-3. Other examples include errors that occur when the transaction violates other data validation rules that may be imposed by the server that are not imposed by the handheld application.

In a block 709, the sync client then processes the transaction errors. In one embodiment, sync client 401 prompts the user to manually correct the error. In another embodiment, errors are available on a separate error screen that the user can choose to view to manually correct or ignore.

Figure 8:
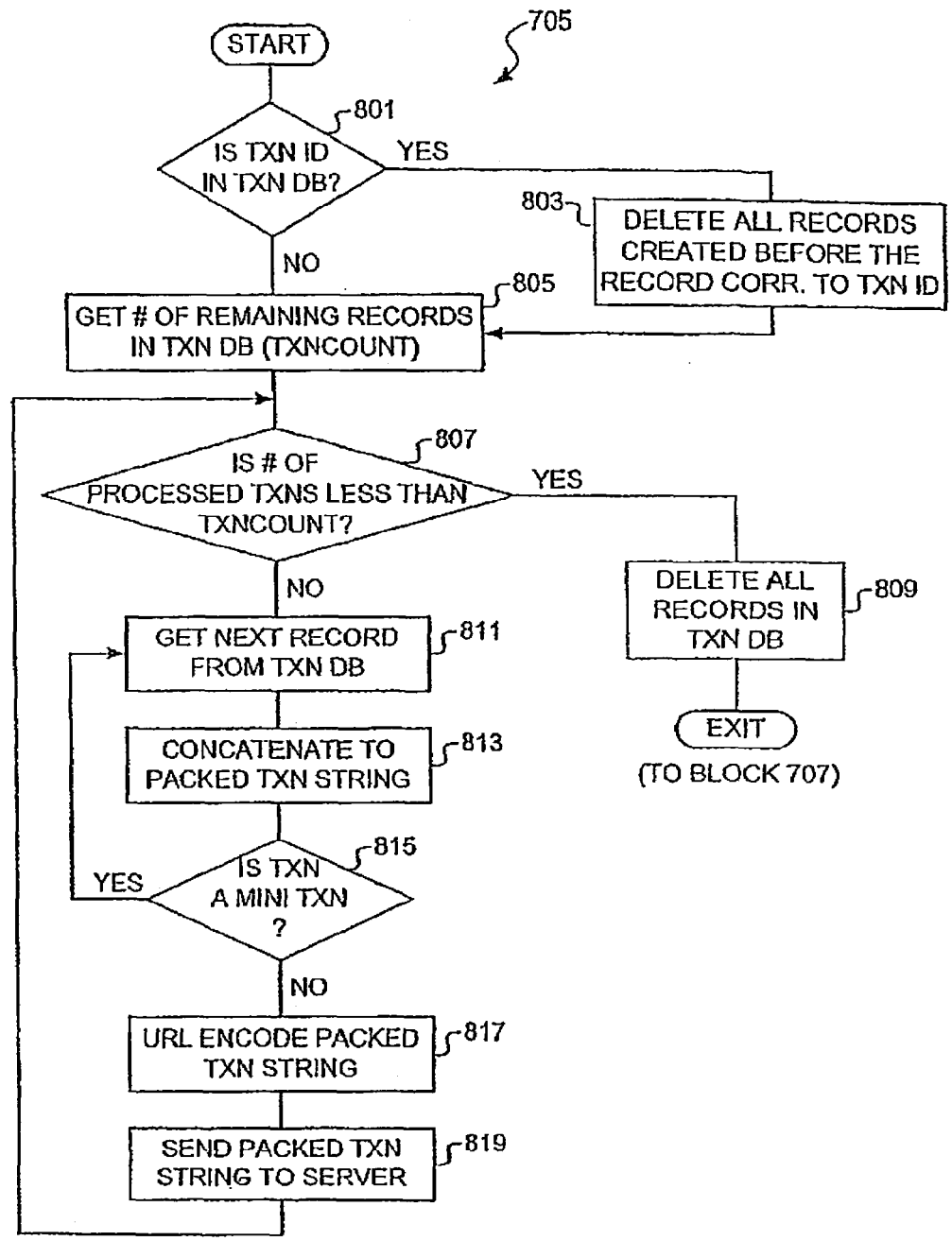
FIG. 8 is a flow diagram illustrating a send transaction operation, according to one embodiment of the present invention.

FIG. 8 illustrates block 705 (FIG. 7) in more detail, according to one embodiment of the present invention. A sync client performs the operations of FIG. 8. In this embodiment, the sync client resides in handheld device 120-3 having a direct connection with server 116. As in the description of FIG. 6, the transaction processing operation of block 705 is described in conjunction with handheld device 120-3 (FIG. 4) and server 116 (FIG. 1). However, in light of the present disclosure, those skilled in the art will appreciate that the following description can apply to other types of sync clients without undue experimentation. Referring to FIGS. 4 and 8, block 705 is performed as follows in this exemplary embodiment.

In a block 801, sync client 401 determines whether the transaction ID received in block 701 (FIG. 7) is stored in transaction database 405 (FIG. 4). If the received transaction ID is in transaction database 405, then all of the transaction records in transaction database 405 created before the transaction corresponding to the received transaction ID have already been received by server 116 and thus are no longer needed. In one embodiment, sync client 401 performs a block 803 in which it deletes all of the transaction records in transaction database 405 having a transaction ID that is smaller than (i.e., created before) the received transaction ID.

However, if in block 801 sync client 401 determines that the received transaction ID is not in transaction database 405, then none of the transaction records remaining in transaction database 405 have been properly received by server 116. In a block 805, sync client 401 determines the number of unprocessed transaction records stored in transaction database 405. In one embodiment, this number is stored in a variable (referred to herein as TXNCOUNT for convenience). Block 805 is also performed following the completion of block 803.

In a block 807, sync client 401 determines whether the number of processed transaction records is less than the value of TXNCOUNT. That is, following block 805, the number of processed transaction records in the current performance of block 705 is set to zero. As each transaction record in transaction database 405 is processed (e.g., uploaded to server 116), the number of processed transaction records is incremented. When the number of processed transaction records reaches the value of TXNCOUNT, then all of the transaction records in transaction database 405 have been processed. In this case, the process proceeds to a block 809 in which all of the transaction records stored in transaction database 405 are deleted and block 705 ends.

However, if the number of processed transaction records is less than the value of TXNCOUNT, the process proceeds to a block 811 in which sync client 401 gets the next transaction record from transaction database 405.

In a block 813, sync client 401 adds the transaction record to a transaction string or message that is to be uploaded to server 116. In one embodiment, sync client 401 packs the transaction record in a transaction string that is to be uploaded to server 116. In some other embodiments, a transaction record may be stored in transaction database 405 as a series of small mini-transaction records (especially if the transaction is a complex or large transaction). In block 813, sync client 401 would concatenate a mini-transaction record with the existing transaction string.

In a block 815, sync client 401 determines if the transaction record is a mini-transaction record. For example, in one embodiment, each mini-transaction record of a transaction would have the same transaction ID. Sync client 401 can determine whether a transaction record is a mini-transaction record by comparing the transaction ID of the current transaction record with the transaction ID of the previous transaction record. If the transaction record is a mini-transaction record, then the operational flow loops back to block 811. However, if the transaction record is not a mini-transaction, then a block 817 is performed.

In block 817, in this embodiment, the transaction string (from block 813) is URL (Uniform Resource Locator) encoded so that the string can be sent to server 116 via an HTTP connection. In one embodiment, sync client 401 URL encodes the transaction string.

In a block 819, the URL encoded transaction string is uploaded. In one embodiment, sync client 401 places the encoded transaction string in the header of an HTTP request sent to server 116. If the transaction string is too large (e.g., greater than two kilobytes), the string is uploaded using more than one HTTP request. After the transaction string is uploaded, the process returns to block 807. The process repeats until all of the transaction records in transaction database 405 have been processed.

Figure 9:
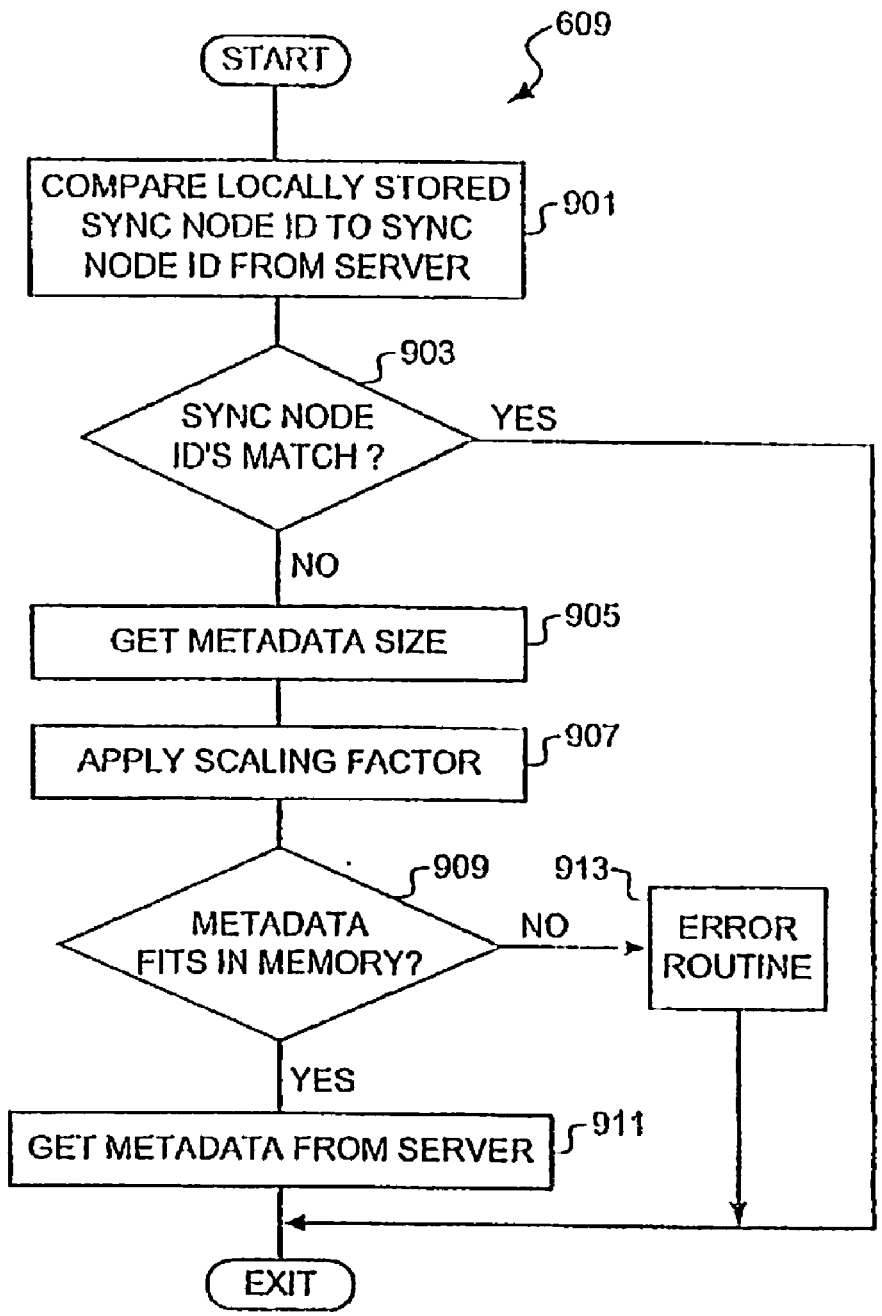
FIG. 9 is a flow diagram illustrating a metadata update operation, according to one embodiment of the present invention.

FIG. 9 illustrates block 609 (FIG. 6) for updating metadata, according to one embodiment of the present invention. A sync client performs the operations of FIG. 9. In this embodiment, the sync client resides in handheld device 120-3 (FIG. 4) having a direct connection with server 116 (FIG. 1). As in the description of FIG. 6, the transaction processing operation of block 609 is described in conjunction with handheld device 120-3 (FIG. 4) and server 116 (FIG. 1). However, in light of the present disclosure, those skilled in the art will appreciate that the following description can apply to other types of sync clients without undue experimentation. Referring to FIGS. 4 and 9, block 609 is performed as follows in this exemplary embodiment.

In a block 901, sync client 401 compares the locally stored sync node ID (i.e., stored in datastore 409) with the sync node ID from server 116 (see block 605 of FIG. 6). The locally-stored sync node ID indicates the version of the handheld application residing in handheld device 120-3, whereas the sync node ID from server 116 indicates the version of the handheld application that handheld device 120-3 should have (e.g., the handheld application may have been updated since the last time handheld device 120-3 was synchronized).

In a block 903, sync client 401 determines whether the sync node IDs match. If they match, then handheld device 120-3 has the correct version of the handheld application and block 609 terminates. However, if they do not match, handheld device 120-3 must be updated with the correct version of the handheld application. Thus, if in block 903 the sync node IDs do not match, the process proceeds to a block 905.

In block 905, sync client 401 gets the size of the metadata. In one embodiment, sync client 401 gets the size of the metadata from server 116. However, this size does not represent the size the metadata will occupy in handheld device 120-3 when downloaded and stored in the datastore.

In a block 907, sync client 401 applies a scaling factor to the size received in block 905 to determine a maximum expected size of the executed metadata. In one embodiment, this scaling factor is determined experimentally. In other embodiments, the scaling factor may be configurable or dynamically determined. The scaling factor ensures that the actual size of the executed metadata is less than or equal to the maximum expected size.

In a block 909, sync client 401 determines whether the memory available in handheld device 120-3 is sufficient to store the metadata. In one embodiment, sync client 401 compares the maximum expected size determined in block 907 with the available memory.

If there is sufficient available memory, sync client 401 gets the metadata from server 116 in a block 911. In one embodiment, sync client 401 pulls the metadata from server 116 in a single transfer. In another embodiment, sync client 401 pulls the metadata from server 116 in a series of smaller transfers.

If in block 909 there is not sufficient available memory, the process proceeds to a block 913. In block 913, sync client 401 performs an error routine to gracefully exit block 609. For example, sync client 401 can cause handheld device 120-3 to display a message to the user that there is insufficient memory available to complete the synchronize process and suggest that the user delete unneeded files and retry the synchronization process. In another embodiment, the error routine of block 913 can prompt the user to free memory space and once the user does so, return to block 909 instead of exiting.

Figure 10:
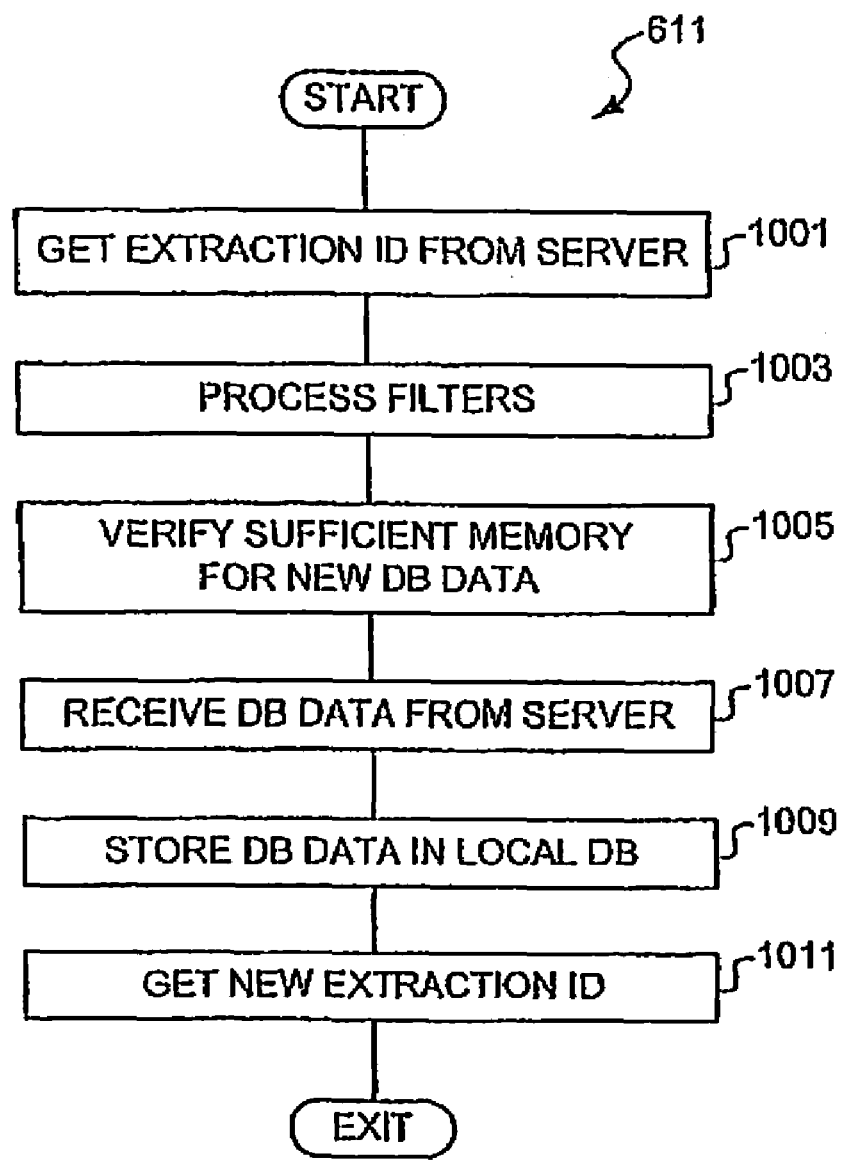
FIG. 10 is a flow diagram illustrating a data extraction operation, according to one embodiment of the present invention.

FIG. 10 illustrates block 611 (FIG. 6) for extracting database data, according to one embodiment of the present invention. A sync client performs the operations of FIG. 10. In this embodiment, the sync client resides in handheld device 120-3 (FIG. 4) having a direct connection with server 116 (FIG. 1). As in the description of FIG. 6, the transaction processing operation of block 611 is described in conjunction with handheld device 120-3 (FIG. 4) and server 116 (FIG. 1). However, in light of the present disclosure, those skilled in the art will appreciate that the following description can apply to other types of sync clients without undue experimentation. Referring to FIGS. 4 and 10, block 611 is performed as follows in this exemplary embodiment.

In a block 1001, sync client 401 gets the extraction ID from server 116. In one embodiment, sync client 401 gets this information in block 603 (FIG. 6) as part of the initialization information. This extraction ID indicates the version of the database that handheld device 120-3 should have. In addition, handheld device 120-3 also locally stores the extraction ID (e.g., in datastore 409) that indicates the version of the database currently residing in handheld device 120-3. These extraction IDs can be different if the database architecture was updated since the last time handheld device 120-3 was synchronized. For example, main database 112 (FIG. 1) may have been updated to add and/or delete fields or tables.

In a block 1003, sync client 401 processes the filters. In one embodiment, the user may have modified the filter settings on handheld device 120-3. As previously described, the filter settings are used by the server to download only the database data desired by the user. One advantage of this filtering is that it reduces the amount of downloaded data to a size that can fit in the memory of handheld device 120-3. Sync client 401 can download the filter settings stored in server 116 and use them to update the locally updated filter settings. Sync client 401 can also upload the user modified filter settings to server 116. The server will ensure that the user modified filter settings are valid settings. The valid new filter settings are used by the server in downloading database data to handheld device 120-3.

In a block 1005, sync client 401 determines whether handheld device 120-3 has sufficient memory available to store the database data to be downloaded by server 116. In one embodiment, sync client 401 gets the size of the data extract from server 116. As previously mentioned, server 116 accesses main database 112 (FIG. 1) to create an extract of database data that is visible to handheld device 120-3 and has been filtered according to the valid filter settings uploaded from the handheld device. Server 116 provides the size of the data extract (either a full extract or a delta extract) to sync client 401, which can then determine whether there is sufficient memory available in handheld device 120-3.

If there is sufficient memory, sync client 401, in a block 1007, pulls the data extract (either full or delta) from server 116. Sync client 401 can pull the data extract in a single transfer or in a series of smaller transfers. In a block 1009, sync client 401 stores the extract in local database 308.

However, if handheld device 120-3 does not have sufficient memory available to store the extract, block 611 terminates. For example, sync client 401 can execute an error routine similar to block 913 (FIG. 9) to gracefully exit from block 611.

In a block 1011, sync client 401 gets a new extraction ID from server 116. Sync client 401 may omit block 1011 if the locally stored extraction ID is the same as the extraction ID received from server 116 in block 1001.

Figure 11:
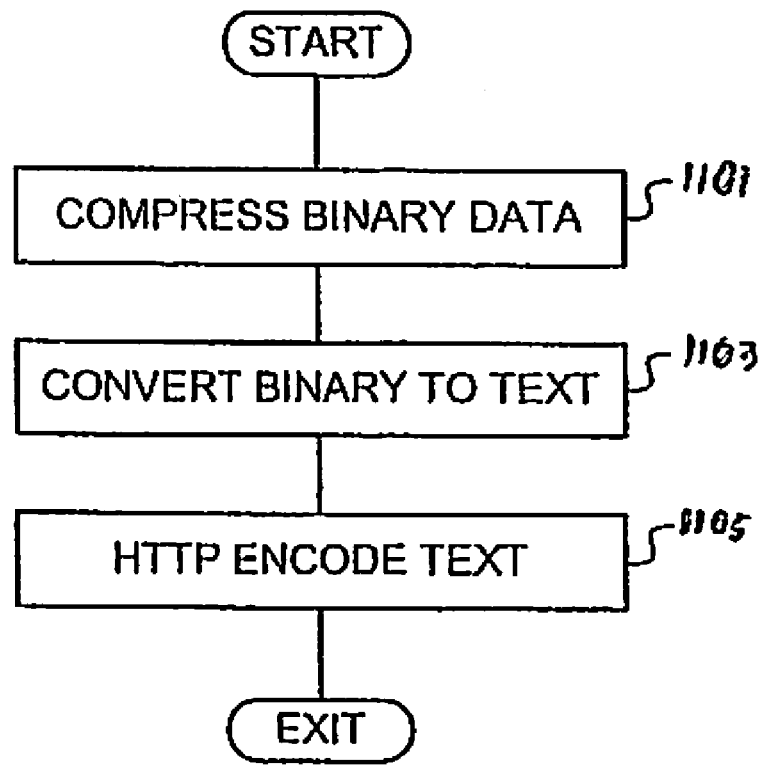
FIG. 11 is a flow diagram illustrating a compression operation, according to one embodiment of the present invention.

FIG. 11 illustrates a compression operation, according to one embodiment of the present invention. This compression operation can be performed by a sync client (e.g., sync client 401 of FIG. 4) or a server (e.g., server 114 or 116 of FIG. 1). For example, this compression operation can be performed by server 116 before sending database data (e.g., a delta extract) to sync client 401. This compression algorithm can also be used by sync client 401 to send information back to server 116. For example, this compression operation can be used to implement block 703 (FIG. 7). This compression operation advantageously reduces the time needed to transfer information between a server and a sync client.

In a block 1101, information to be transmitted is compressed. In one embodiment, the information is binary data such as database data, transaction data or metadata. Any suitable compression algorithm can be used. In one embodiment, the binary information is compressed using the Zip 2.3 compression utility available from www.info-zip.org. In other embodiments, other compression algorithms can be used.

In a block 1103, the compressed binary data is converted to text. In one embodiment, the compressed binary data is converted to text using standard Base-64 encoding. The conversion to text helps reduce corruption of the data during the transmission process. In a further refinement, the text data can include mark-up using a mark-up language such as XML (extensible mark-up language) or HTML (hypertext mark-up language).

In a block 1105, the text data generated in block 1103 is encoded using a protocol suitable for the connection between the server and sync client. In one embodiment, standard hypertext transfer protocol (HTTP) is used to encode the text data for transmission over the Internet. In other embodiments, different protocols can be used, depending on the nature of the connection between the server and the sync client. For example, in other embodiments, the text data may be file transfer protocol (FTP) encoded. This compressed and encoded information can then be sent to the intended recipient.

In a further refinement of this operation, the information to be sent can be broken into smaller units that are then separately compressed and encoded according to blocks 1101, 1103, and 1105. These smaller units are sent separately to the recipient so that, before receiving the next unit of information, the recipient can: (a) store the compressed unit of information; (b) decompress the stored compressed unit of information; (c) store the decompressed unit of information; and (d) delete the compressed unit of information. This refinement reduces the amount of available memory needed by the recipient to properly receive and decompress the transmitted information. In some embodiments, block 1103 can be omitted with block 1105 encoding the compressed binary data from block 1101 instead of text.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
    a server sending an identification to a synchronization client executing on a handheld device, wherein the identification relates to a database version;
    the synchronization client comparing the identification received from the server with a locally stored identification;
    the synchronization client sending a first message to the server if the identification does not compare equally with the locally stored identification;
    in response to receiving the first message, the server sending a size of binary information to the synchronization client;
    the synchronization client comparing the size of the binary information with an amount of storage available in the handheld device;
    the synchronization client sending a second message to the server if the synchronization client determines that the amount of storage available in the handheld is greater than the size of the binary information
    in response to the server receiving the message, the server compressing the binary information prior to transfer;
    the server encoding the compressed binary information using a text encoder prior to transfer; and
    the server encoding the text encoded information prior to transfer according to a protocol associated with a connection between the server and the synchronization client.

2. The method of claim 1, wherein the binary information is compressed using a Zip compression utility.

3. The method of claim 1, wherein the text encoder comprises a Base-64 encoder.

4. The method of claim 1, wherein the protocol is the hypertext transfer protocol.

5. The method of claim 1, wherein the binary information comprises database data stored on the server.

6. The method of claim 1, wherein the binary information comprises metadata stored on the server.

7. The method of claim 1, wherein the binary information comprises transaction information stored on the handheld device.

8. The method of claim 1, further comprising parsing the binary information into smaller units.

9. An apparatus, comprising:
    means for comparing an identification with a locally stored identification, wherein the identification relates to a database version;
    means for sending a first message if the identification does not compare equally with the locally stored identification;
    means for sending a size of binary information to a handheld device in response to receiving the first message;
    means for comparing the size of binary information and an amount of storage available in the handheld device;
    means for sending a message to a server if the size of binary information is less than the amount of storage available in the handheld device;
    means for compressing the binary information prior to transfer to the handheld device;
    means for text encoding the compressed binary information prior to transfer to the handheld device; and
    means for encoding the text encoded information prior to transfer to the hand held device according to a protocol associated with a connection between the server and the handheld device.

10. The apparatus of claim 9, wherein the means for compressing binary information comprises a Zip compression utility.

11. The apparatus of claim 9, wherein the means for text encoding comprises a Base-64 encoder.

12. The apparatus of claim 9, wherein the protocol is the hypertext transfer protocol.

13. The apparatus of claim 9, wherein the binary information comprises database data stored on the server.

14. The apparatus of claim 9, wherein the binary information comprises metadata stored on the server.

15. The apparatus of claim 9, wherein the binary information comprises transaction information stored on the handheld device.

16. The apparatus of claim 9, further comprises further comprising means for parsing the binary information into smaller units.

17. A machine-readable medium having stored thereon a plurality of instructions that when executed by a server cause the server to perform operations comprising:
    sending an identification to a handheld device, wherein the identification relates to a database version
    comparing a size of binary information and an amount of storage available in a hand held device in response to the server receiving information from the hand held device that identifies the amount of storage available in the handheld device and in response to the server receiving a first message from the handheld device indicating the identification does not compare equally to a locally stored identification;
    in response to determining that the amount of storage in the handheld device exceeds the size of the binary information, compressing the binary information prior to transfer to the handheld device;
    encoding the compressed binary information using a text encoder; and
    encoding the text encoded information prior to transfer to the handheld device according to a protocol associated with a connection between the server and the handheld device.

18. The machine-readable medium of claim 17, wherein the binary information is compressed using a Zip compression utility.

19. The machine-readable medium of claim 17, wherein the text encoder comprises a Base-64 encoder.

20. The machine-readable medium of claim 17, wherein the protocol is the hypertext transfer protocol.

21. The machine-readable medium of claim 17, wherein the binary information comprises database data stored on the server.

22. The machine-readable medium of claim 17, wherein the binary information comprises metadata stored on the server.

23. The machine-readable medium of claim 17, wherein the method further comprises parsing the binary information into smaller units.

* * * * *